(12) United States Patent
Hill

(10) Patent No.: US 8,371,782 B2
(45) Date of Patent: Feb. 12, 2013

(54) ADJUSTABLE MID- GATE

(76) Inventor: Steven B Hill, Waldorf, MD (US)

( * ) Notice: Subject to any disclaimer, the term of this patent is extended or adjusted under 35 U.S.C. 154(b) by 0 days.

(21) Appl. No.: 12/042,371

(22) Filed: Mar. 5, 2008

(65) Prior Publication Data

US 2009/0226277 A1    Sep. 10, 2009

(51) Int. Cl.
*B60P 7/08* (2006.01)

(52) U.S. Cl. ........ 410/138; 410/129; 410/130; 410/132; 410/135; 410/139; 410/121

(58) Field of Classification Search .......... 410/129–130, 410/132–143, 118, 121, 94, 150–151; 296/24.4, 296/37.6; 224/42.33, 42.34, 403, 404; 220/530–531, 534, 541–542, 544–546, 549, 220/550, 552
See application file for complete search history.

(56) References Cited

U.S. PATENT DOCUMENTS 5,586,850 A * 12/1996 Johnson ......................... 410/138
6,206,624 B1 * 3/2001 Brandenburg ................. 410/132

\* cited by examiner

*Primary Examiner* — Stephen Gordon
(74) *Attorney, Agent, or Firm* — Michael L. Greenberg, Esq.; Greenberg & Lieberman, LLC

(57) ABSTRACT

An adjustable array of gates and partitions for vehicles, particularly pickup truck beds, that enables succinct partitioned areas for a more organized load. A partition apparatus extends from between the two sides of a truck bed and may be moved forward or backward, including over wheel wells, through the use of rails. In addition, telescoping panels secured perpendicularly from the partition apparatus offers additional partition capabilities as the telescoping panels move from side to side through the use of additional rails.

10 Claims, 12 Drawing Sheets

ADJUSTABLE MID- GATE

FIELD OF THE INVENTION

The present invention relates to partitioning a portion of a vehicle or any other compartment that needs to be divided.

BACKGROUND OF THE INVENTION

Automobiles are varied in form and function. Some automobiles are built for speed, others are built for fuel economy, and still others are built for hauling large loads. Whether fast, economical, or haulers, all automobiles benefit from having some sense of organization. A fast automobile requires organization to properly align its minimalist parts and structure to achieve a desired speed. An economical automobile requires organization to provide adequate room for occupants and luggage, but not guzzle gas. A hauling automobile requires organization so that everything being hauled does not simply become disorganized and damaged.

Traditionally, pickup trucks have been used for many typical hauling activities. In the simplest form of organization, a toolbox is frequently installed in the bed of pickup to allow carpenters and others to carry their tools to and from jobs in an organized fashion. The toolbox leaves a large portion of the pickup truck bed untouched, and thus, that untouched portion can be easily used to store items that the user does not want to confuse with tools.

As pickup trucks have become more generally accepted for even everyday use by the average homeowner, the need for organization beyond typical job use has emerged. For example, if the user wants to carry a bicycle in a pickup truck, as well as garbage for the dump, as well as bags of mulch from the hardware store, there emerges the need for a way to partition a pickup truck bed depending upon the relative size and shape of the items being stored therein. Even for carpenters and other tradesmen, partitioning the bed of pickup trucks is not enough, but there exists a need for a variable partitioning method that is fully adjustable for the various sizes of loads to be partitioned.

Further, there is a need for a partitioning system that is particularly designed with the pickup truck bed in mind. A pickup truck bed is unique compared to a conventional drawer, for example, because a pickup truck bed is subject to inertia and swaying motion while the pickup truck is moving. Moreover, a pickup truck bed has wheel wells that intrude into the usable space of the pickup truck bed itself.

Although there are multiple compartment dividers already in existence, they have inherent limitations that ultimately restrict their usefulness.

U.S. Pat. No. 6,629,807 issued to Bernardo on Oct. 7, 2003, is a truck bed cargo barrier, primarily used to stabilize cargo both longitudinally and laterally. Bernardo's device uses a track system on the sides of the pickup truck bed; however, Bernardo's device does not anticipate that an extendable swinging gate or door might be needed, as does the present invention. Bernardo's device does not recognize that there is added protection required for a unit carried in the bed of a pickup truck. Merely dividing the bed of a pickup truck and using bungie cords is not stable protection for a unit carried in the bed of a pickup truck. Additionally, Bernardo's device, unlike the present invention, does not have a locking piece that positions the gate in Bernardo's device along a rail system—and without a locking piece, Bernardo's device cannot effective restrain a unit carried in the bed of a pickup truck from movement during transportation.

U.S. Pat. No. 6,524,043 issued to Earle et al. on Feb. 25, 2003, is an adjustable cargo gate system for a flatbed. Earle et al.'s device uses a plurality or series of tracks positioned along the bottom of the truck bed in addition to a gate. Unlike the present invention, Earle et al's device does not contemplate mounting along tracks on the side rails of a bed of a pickup truck. The only stability provided by Earle et al.'s device is along the floor of the bed of a pickup truck; and the present invention has much more than merely tracks along the floor of the bed of a pickup truck.

U.S. Pat. No. 6,688,821 issued to Snyder on Feb. 10, 2004, shows an adjustable cargo area organizer system witch a first divider that spans the bed of a pickup truck from side to side, and the first divider is abutted up against the two side walls of the pickup truck bed. Slots on the front and the backside of the first divider receive dividing members that slide into place. Thus, with Snyder's device, a user is able to partition the bed of a pickup truck. Unlike the present invention, Snyder's device does not employ side rails to easily position the first divider towards the front and rear of the bed of a pickup truck. Further, unlike the present invention, Snyder's device does not allow for the first divider to clear wheel wells. Moreover, unlike the present invention, Snyder's device does not contemplate and means for stability from the floor of the bed of a pickup truck in case a unit presses hard against the first divider.

U.S. Pat. No. 5,586,850 issued to Johnson on Dec. 24, 1996, shows a truck bed cargo divider that has a panel that is roughly the same dimensions as the tailgate on a pickup truck. A track mounted on the sidewalls of the bed of the pickup truck allows the panel to ride the length of the bed of the pickup truck. Cut out areas allow the panel to move past the wheel wells of the pickup truck, and doors attached to the panel are adapted to close off the cut out areas when not obstructed by the wheel wells. Locking bolts on each side of the panel engage slots in the sidewalls of the pickup truck and the floor of the pickup truck. Unlike the present invention, Johnson's device does not drop down to allow insertion of heavy items into the pickup truck bed. Further, unlike the present invention, Johnson's invention does not have two panels that are mounted roughly perpendicular to one another to securely hold a unit by sliding both front and rear as well as left and right in a pickup truck bed.

U.S. Pat. No. 5,167,479 issued to Bott on Dec. 1, 1992, shows a cargo restraint system that is mounted to a floor of a pickup truck bed. Unlike the present invention, Bott's device does not have mounting to sidewalls of the pickup truck, and further, does not have any adaptation for clearing the wheel wells of a pickup truck. Moreover, Bott's device does not have any adaptation for securing a unit held on one side of device so that the unit will not move and/or be tossed about.

U.S. Pat. No. D380,706 issued to Gardner on Jul. 8, 1997, shows a truck bed insert that is a panel mounted from left to right across the bed of a pickup truck. Gardner's device appears to be mounted to tracks along the floor of the pickup truck bed, and Gardner's device is also secured to ropes that are attached to each rear corner of the pickup truck. Unlike the present invention, Gardner's device is not wide enough to span the entire width of a pickup truck bed—from left to right—because Gardner's device is short to avoid contacting the wheel wells of a pickup truck. Further, unlike the present invention, Gardner's device does not have any mounting means to a sidewall track of the pickup truck. Moreover, unlike the present invention, Gardner's device does not have a plurality of panels for securely holding a unit in the bed of the pickup truck. Also, Gardner is meant to retrieve items from a cargo bay.

Thus, there is a need for device that allows secure but readily accessible placement of cargo in the bed of a pickup truck. A user does not want to merely rely on bungee cords and straps to secure items, but the user needs compartmentalized storage. Further, the user needs compartmentalized storage that can shift so that the size of compartments can vary as desired.

Moreover, the user needs a device that is fully capable of collapsing in the event that large and/or heavy items are loaded into the bed of a pickup truck—the problem being that a large and/or heavy item needs to be freely loaded in the bed of a pickup truck without obstructions, and once in, the large and/or heavy item needs to be secured. Currently, should a large and/or heavy item need to be loaded in the bed of a pickup truck, any partition or compartmentalized storage and securing system needs to be removed and reinstalled once the large and/or heavy item has been loaded. Not only is such an operation time consuming, but such an operation is enough of an impediment that the user might tend to avoid the entire use of any partition or compartmentalized storage and securing system altogether.

In short, there is a need for a fully adjustable device for securing items in the bed of a pickup truck that can easily be moved out of the way when loading large and/or heavy objects.

SUMMARY OF THE INVENTION

In short, the present invention allows the bed of a pickup truck to be divided into up to 3 distinct sections. Two panels slide along the bed of the pickup truck to allow a user to change the size and number of sections in the bed of the pickup truck.

The present invention is an adjustable mid-gate that allows the user to secure certain items in a truck bed and compartmentalize them as desired. The present invention has a set of support rails on either side of the truck bed. A gate moves forward and rearward within the truck bed, and along the support rails. The present invention has a locking device such as a locking hole to lock the gate into position at various positions in the truck bed.

Additionally, the present invention has a sliding wheel well panel so that the gate of the present invention can slide over a wheel well. On the front of the present invention is a lock for the gate such that the user is able to secure the gate into position along one surface of the truck bed—the floor of the truck bed, such that a gate stop secures the gate to the floor of the truck bed. The gate stop enables the present invention to be locked into position along the bottom edge of the gate. A locking handle along a top edge of the gate secures the present invention to the set of support rails on the sides of the truck bed.

It is an object of the present invention to enable the consumer to compartmentalize the bed of a pickup truck and to provide storage space for small items, which may need to be confined within a specific portion of a truck bed.

DETAILED DESCRIPTION OF THE PREFERRED EMBODIMENT

The preferred embodiment of the overall present invention array 5 will be placed on the floor of a conventional pickup truck bed 6. However, additional embodiments of the present invention may include installation within conventional aspects of other vehicles such as the trunks of cars. Regarding the preferred embodiment relating to pickup truck beds as seen in the present invention array 5 of FIG. 1, we see that a typical pickup truck has a tailgate 8, which serves as the end point of the pickup truck. The present invention serves to develop compartments ranging in size and scope to cater to the unique load needs of the user. As we see in FIG. 1, a number of elements of the present invention array 5 go into creating the compartmentalized nature of the present invention.

Figure 1:
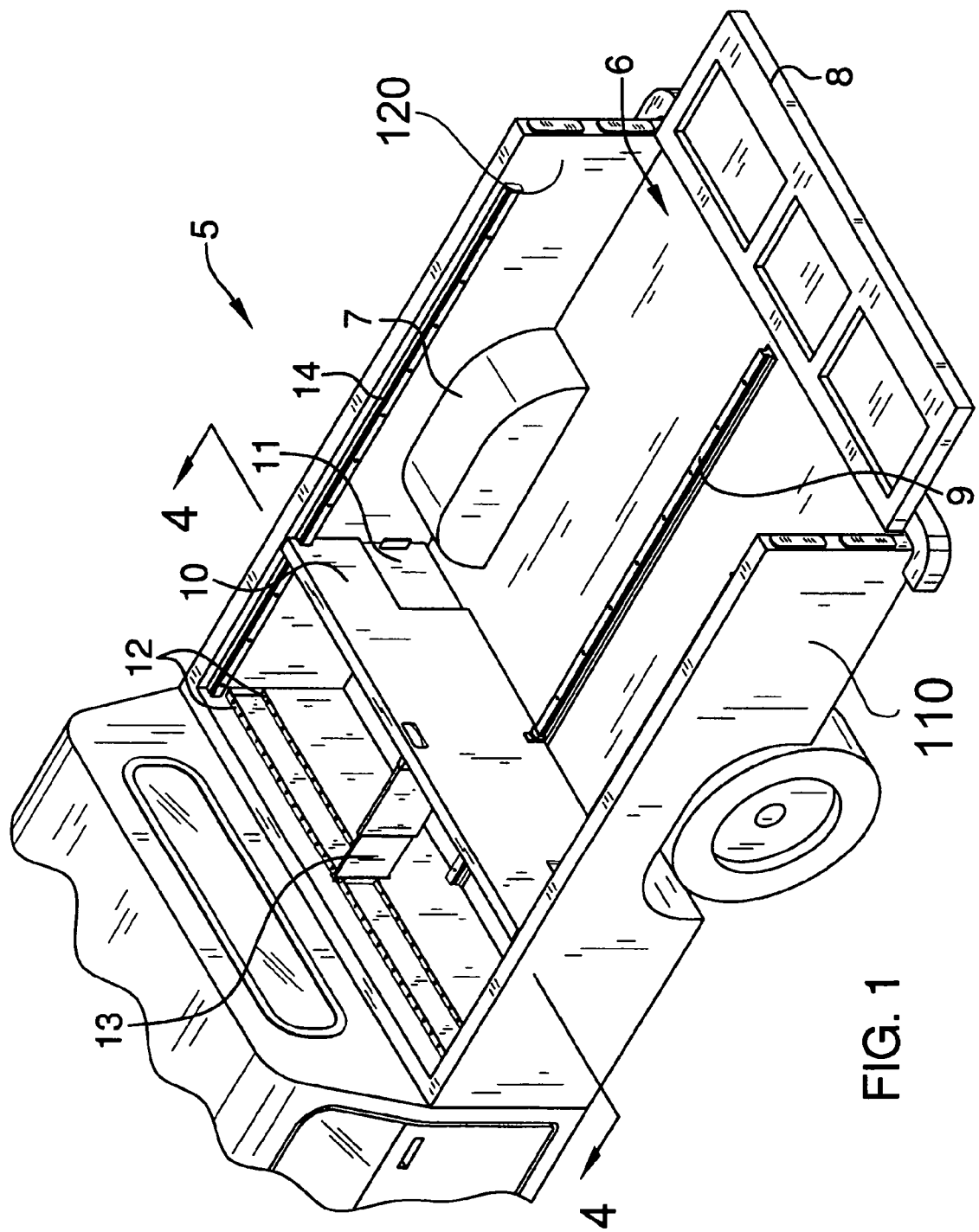
FIG. 1 is an isometric view of the present invention installed in a truck bed.

The present invention, as seen in FIG. 1, is compromised of a rail 9, which is secured to the bottom of the pickup bed 6 via conventional means. The preferred embodiment of the present invention places the rail 9 at the center of the pickup bed 6. The rail 9 extends from the back of the pickup truck to the front of the tailgate 8. A planar, partition apparatus 10 slides along the rail 9 on the bottom of the pickup truck bed 6 in order to create a partition effect in the pickup truck bed 6. The partition apparatus 10 of the preferred embodiment of the present invention is comprised of a hard surface, although it is contemplated that a flexible material also may be used for those occasions where a load is uneven and needs to be stuffed into a partitioned area. The partition apparatus 10 of the preferred embodiment is recessed on the bottom surface of the pickup bed 6 so that the partition apparatus 10 will slide over the rail 9.

Figure 2:
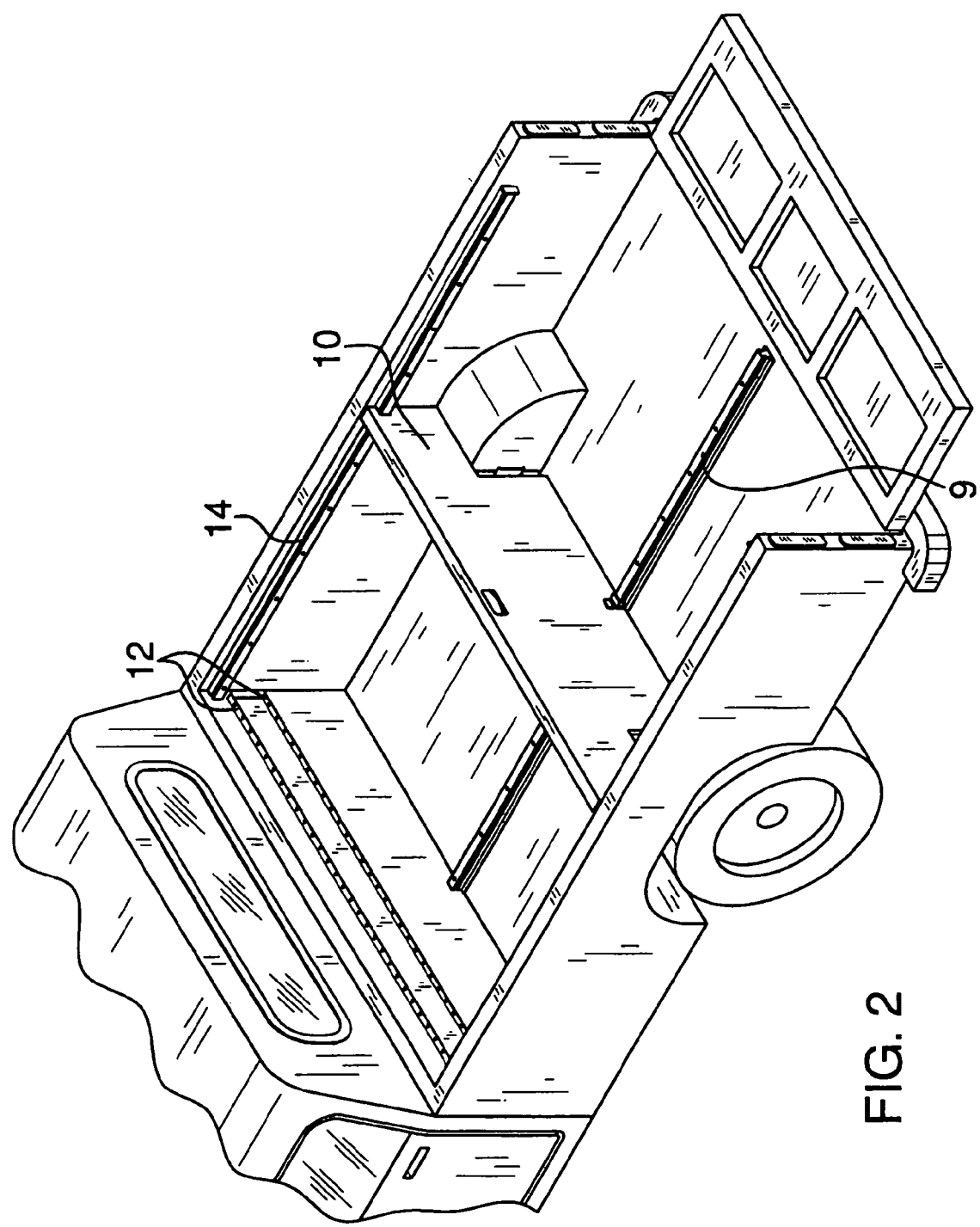
FIG. 2 is an isometric view of the present invention installed with the position over the wheel well panel.
Figure 3:
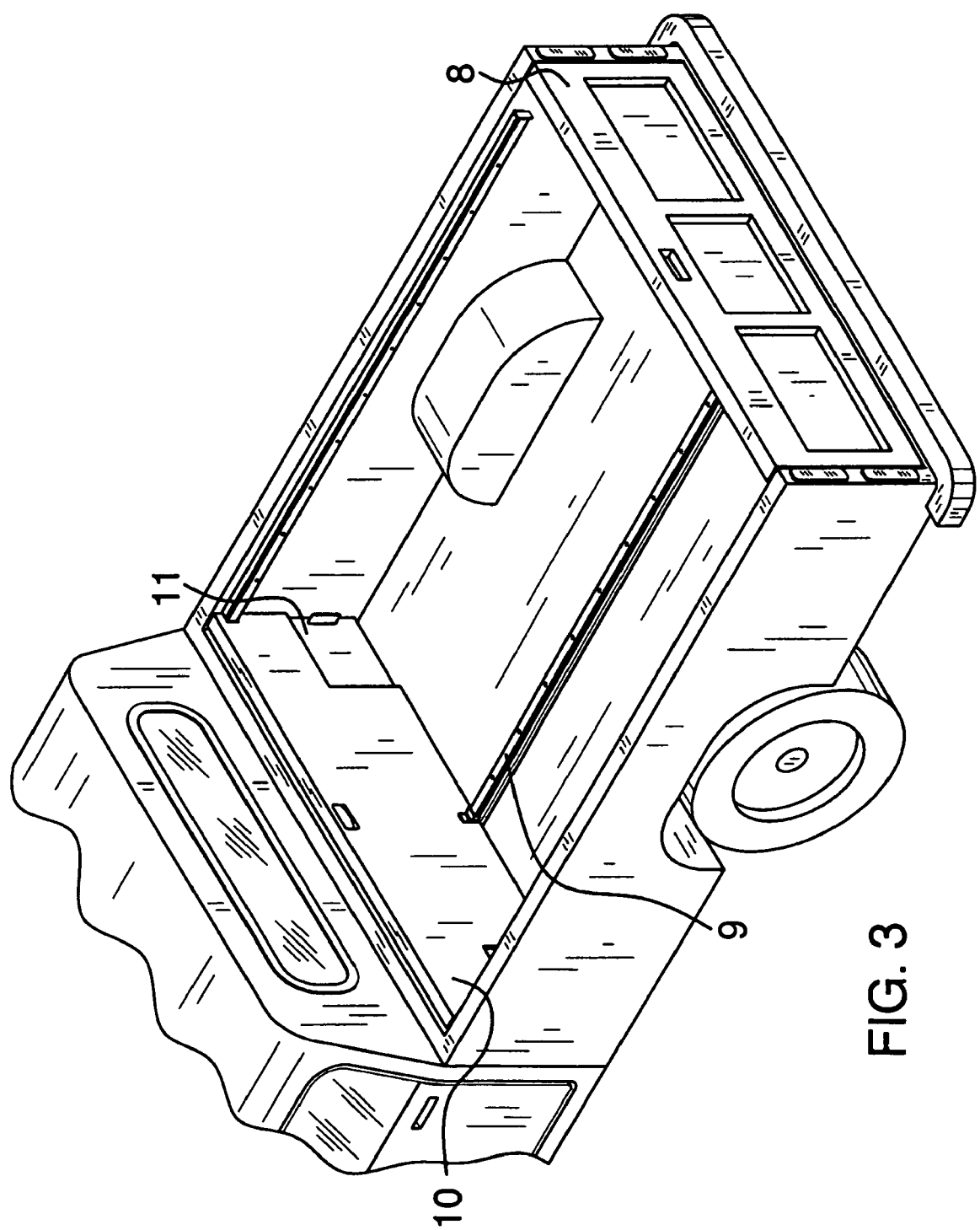
FIG. 3 is an isometric view of the partition apparatus collapsed against the at least one front support rail.

Because typical pickup trucks and vehicles possess wheel wells 7 on each side of the vehicle, the partition apparatus 10 of the present invention has wheel well partitions 11 located on the right and left sides. The wheel well partitions 11 can recess into the partitioned area so that the partition apparatus 10 can travel over the wheel wells 7. This effectively allows the partition apparatus 10 to slide over the wheel wells 7. In FIG. 2, we see a view of how the partition apparatus 10 may be slid over the wheel well 7 through the use of the wheel well partitions 11. The preferred embodiment of FIG. 2 depicts that the wheel well partitions 11 slide inward into a housing area of the partition apparatus 10. The view of FIG. 3 additionally demonstrates the preferred embodiment of the present invention, as the partition apparatus 10 is set into a stored and collapsed position against the cab end of a pickup truck. The position of FIG. 3 is used when there is no need for compartmentalized use of the pickup truck bed 6.

In addition, in FIG. 1 we see that along the sides of the overall present invention array 5 are two side rails 14. The side rails 14 of the preferred embodiment are mounted to the sides of the pickup truck bed 6 and support the partition apparatus 10 near the top surface of the partition apparatus 10. The effect of the side rails 14 allow greater stability in both movement and locked positions for the partition apparatus 10. Specifically, it is preferred that the partition apparatus 10 attaches to the left wall 110 and right wall 120 via roller wheels 23, piston 100, piston spring 16, cylinder 18, linkage 15 and center circular locking disc 17. This aspect is best viewed in FIG. 4 and FIG. 5.

Figure 6:
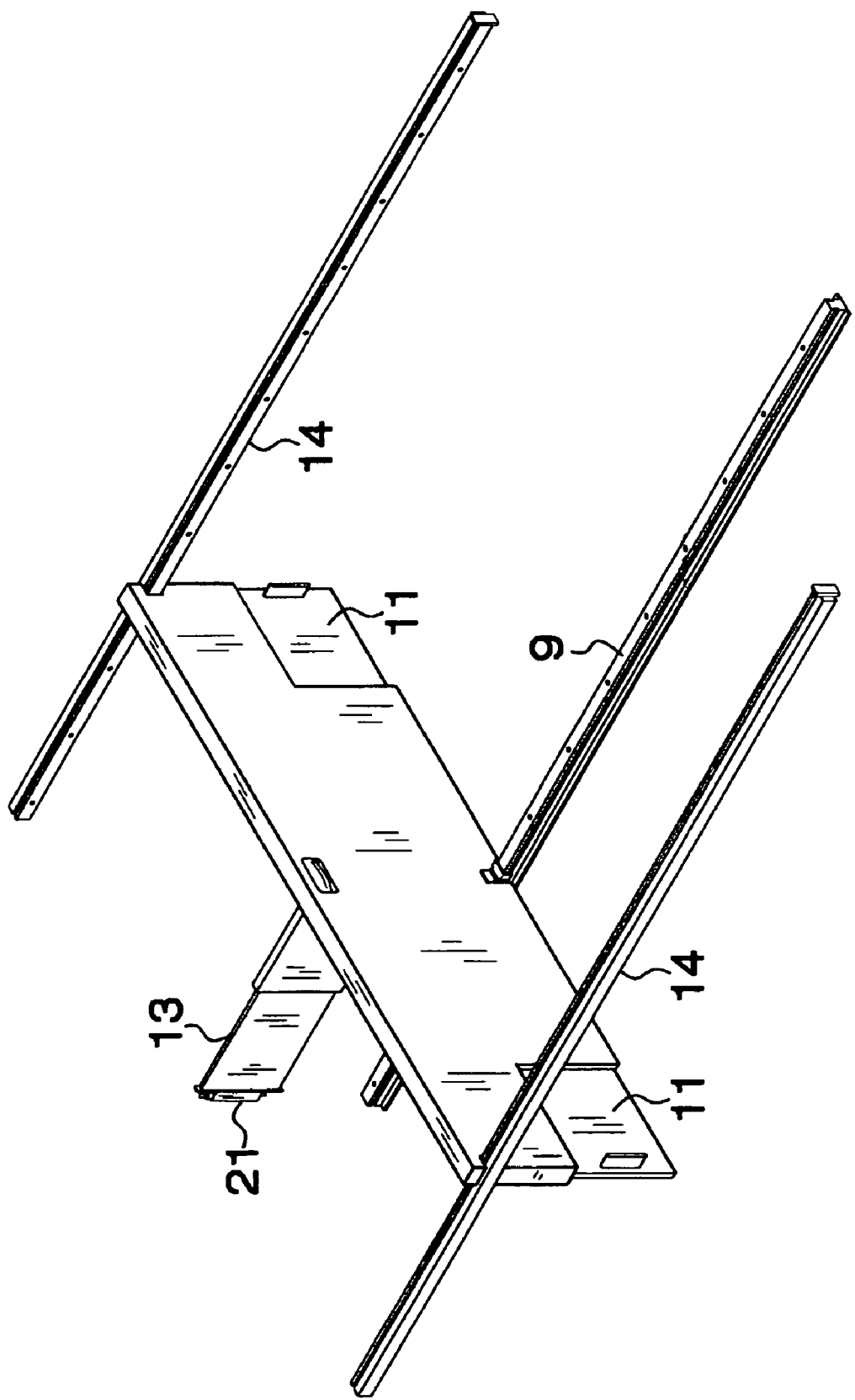
FIG. 6 is an isometric view showing the parts of the present invention without the truck bed.
Figure 7:
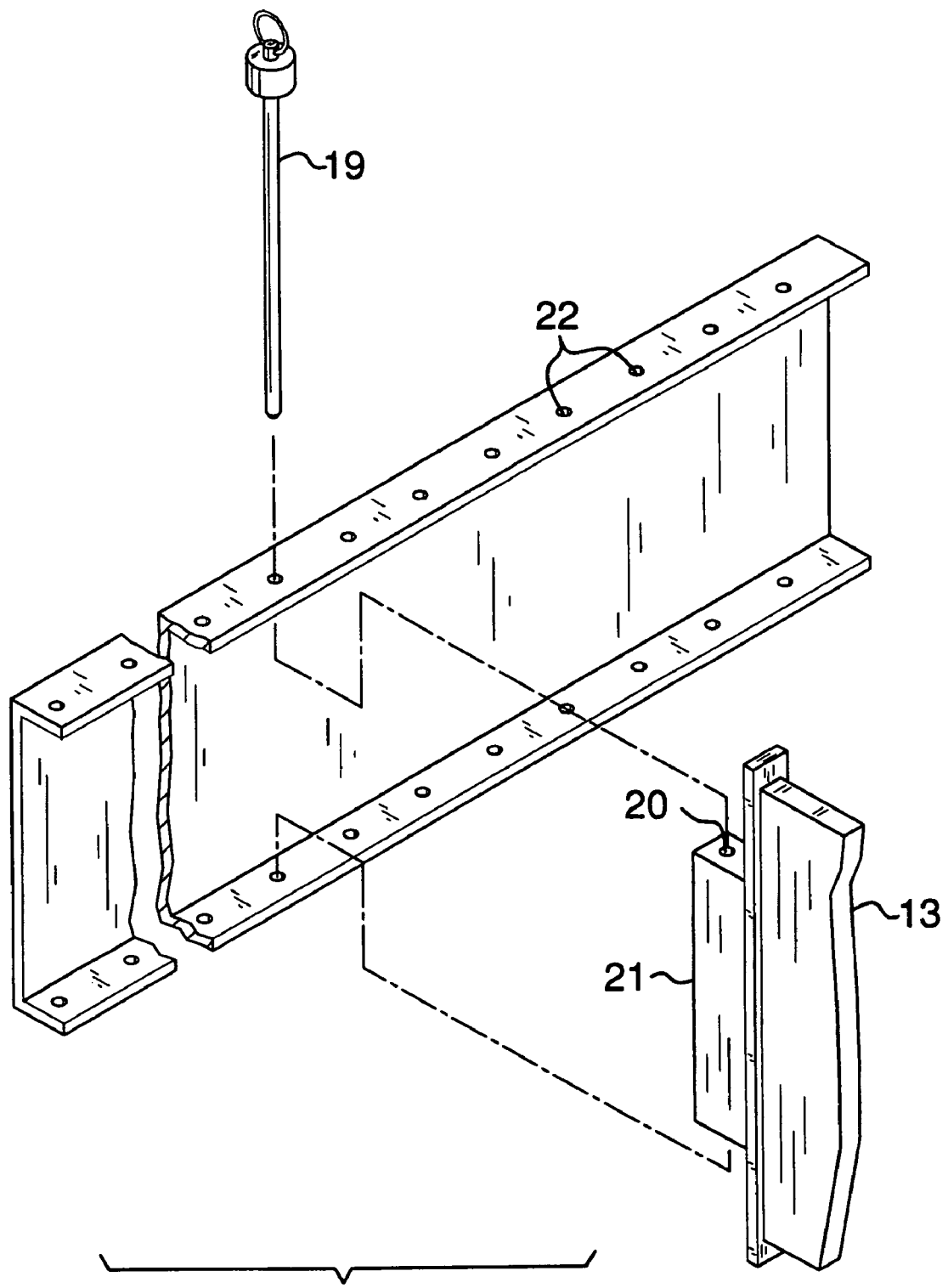
FIG. 7 is a fragmented view of the second mechanism of the telescoping panel.

The present invention also includes at least one telescoping panel 13 located onto a side of the partition apparatus 10. FIG. 1 depicts the use of one telescoping panel 13 positioned perpendicularly between the partition apparatus 10 and the cab side of the pickup bed 6. While this is the preferred embodiment of the present invention, additional telescoping panels 13 can be used at both the cab end of the truck and also onto the tailgate. On one end of the telescoping panel 13 is a flanged-locking member 21. The flanged-locking member 21 is seen in FIG. 1 and better viewed in FIG. 6. The flanged-locking member 21 of the preferred embodiment is positioned in an area where it will fit within the space that is provided by at least one front support rail 12. In the preferred embodiment of the present invention, there is at least one support rail 12 as we see in FIG. 1. These at least one front support rails 12 are mounted to the back of the pickup via conventional means. The support item such as the flanged member 20 as seen in FIG. 7 fits within the width of the flanged-locking members 21 and ultimately allow the telescoping panel 13 to be locked into position using a means of securement as the holes 22 of the preferred embodiment in the at least one front support rails 12 allow a locking element such as a locking pin 19 as seen in FIG. 7 to be secured through the holes 22 of the at least one front support rails 12 and into the flanged member 20.

Figure 11:
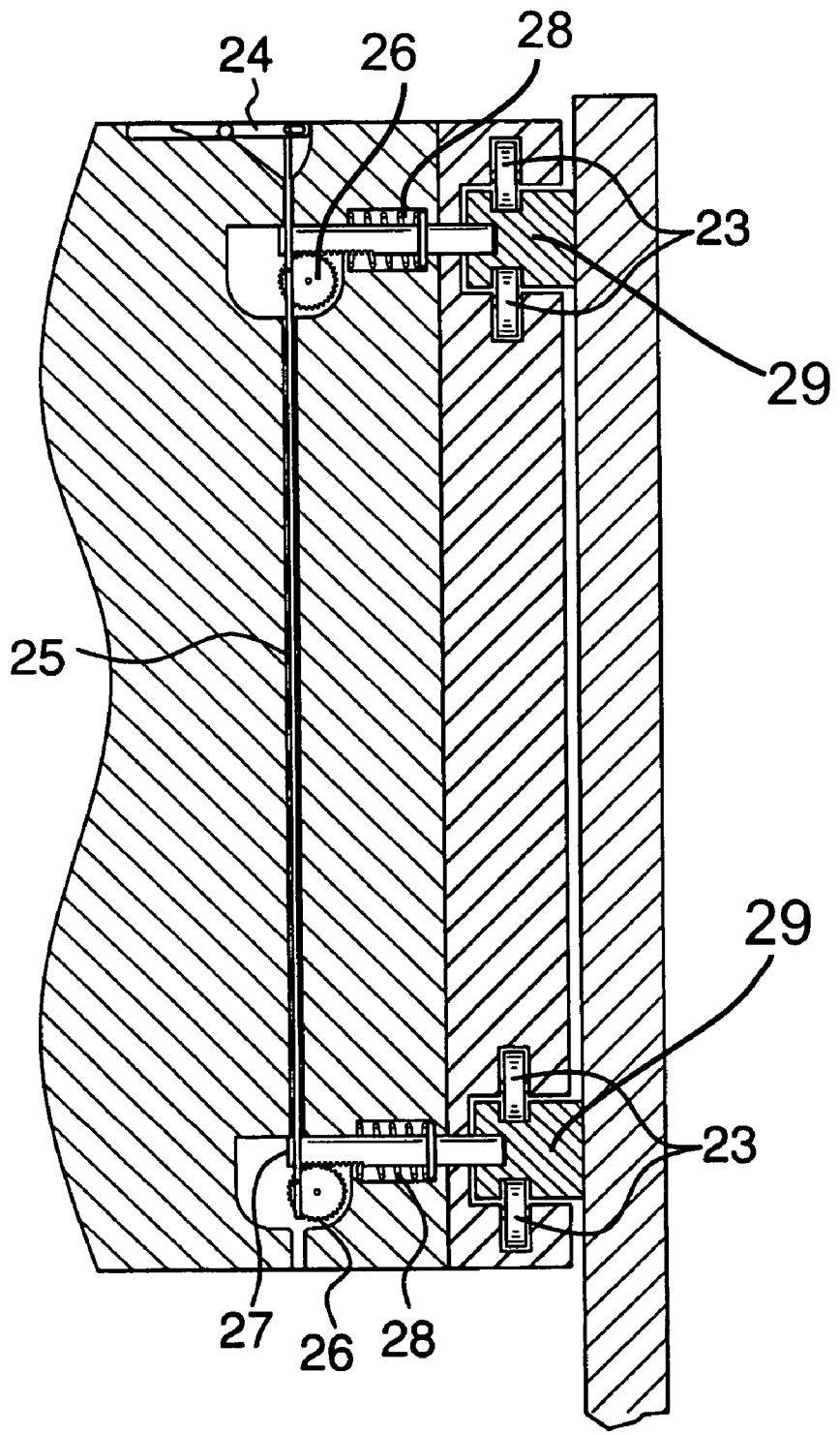
FIG. 11 is a view of an embodiment of the present invention showing the first mechanism in a locked position.
Figure 12:
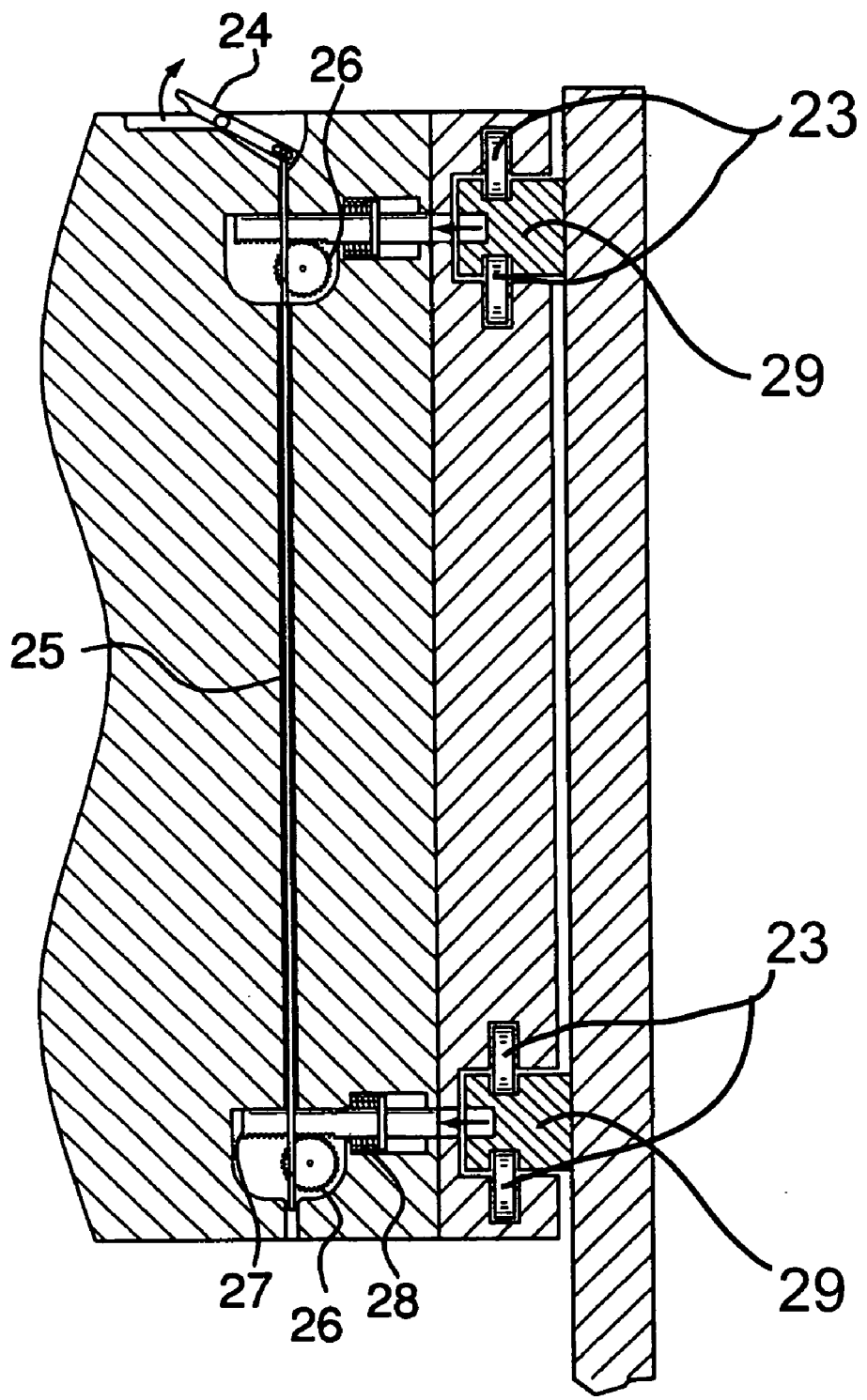
FIG. 12 is an additional view of an embodiment of the present invention showing the first mechanism in an unlocked position.

The partition apparatus 10 can be locked into place using conventional locking means. The preferred embodiment of the present invention is depicted in FIG. 11 and FIG. 12. The locking means of this embodiment as seen in FIG. 11 and FIG. 12 include a locking handle 24, which is connected to a locking cylinder 25. The locking cylinder 25 extends from side to side and locks a set of roller wheels 23 into position by moving the locking handle 24. When locking handle 24 is depressed as shown in FIG. 11, the locking cylinder 25 rolls along the gear 26. When the gear 26 is caused to roll by the locking cylinder 25, the gears 26 causes the knurled cylinders 27 to move along the gears 26. The springs 28 are located along the knurled cylinders 27 and as shown in FIG. 11, when the knurled cylinders 27 moves along the gears 26, the knurled cylinders 27 are pushed toward the roller wheels 23. As the knurled cylinders 27 are pushed toward the roller wheels 23, the springs 28 are extended. When the partition apparatus 10 is locked into place, the partition apparatus 10 and telescoping panel 13 are prevented from moving. The telescoping panel 13 also may be secured to the rail 9, although that is not necessary. In FIG. 11 and FIG. 12, roller wheels 23 are shown allowing telescoping panel 13 to slide along mid rails 29. It should be noted that mid rails 29 are positioned on partition apparatus 10. In addition, a first mechanism is configured to adjust the length of the telescoping panel 13. The first mechanism is preferably roller wheels 23, knurled cylinders 27, gears 26, springs 28, locking cylinder 25 and locking handle 24. A second mechanism is in communication with the telescoping panel 13 and the at least one front support rail 12. The second mechanism is preferably locking pin 19, holes 22, flanged member 20, flanged-locking member 21 and at least one front support rail 12.

Figure 4:
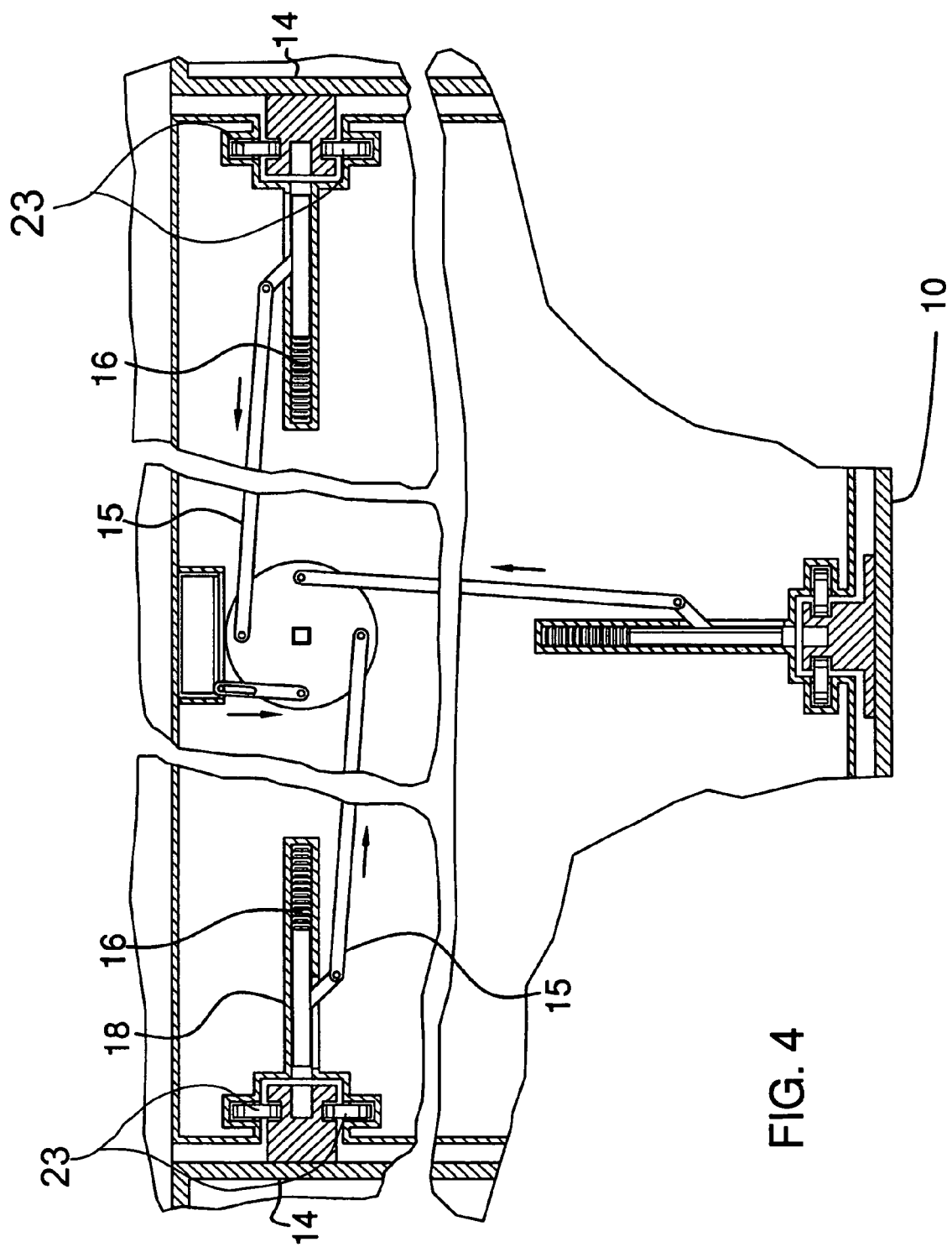
FIG. 4 is a view according to line 4-4 on FIG. 1.
Figure 5:
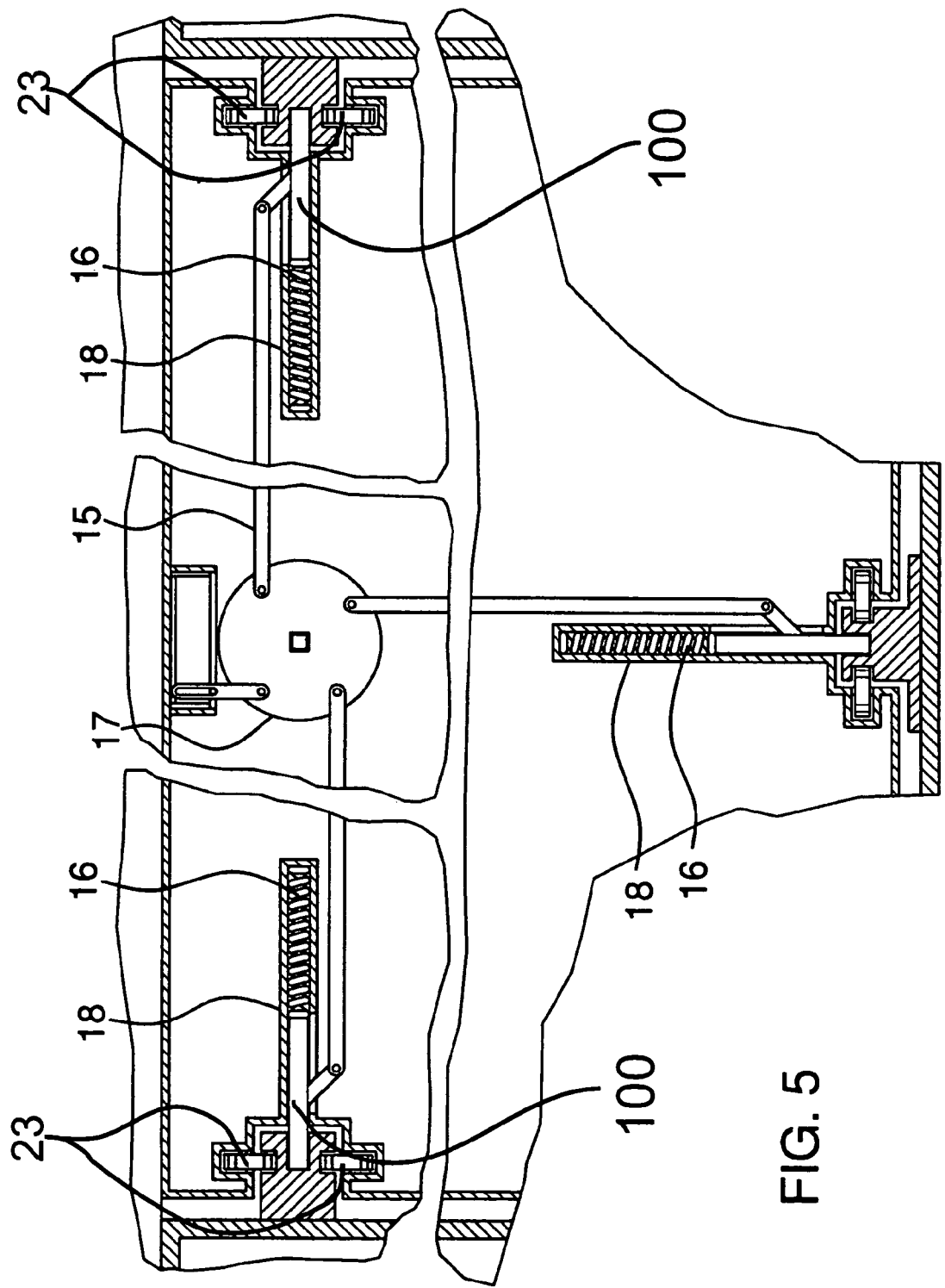
FIG. 5 is a view of FIG. 4 showing the locked position.

However, as mentioned above, the at least one front support rail 12 allow the telescoping panel 13 to move from side to side so that a specific compartment size may be made, depending on the specific needs of the user. Rollers wheels 23 as seen in FIG. 4 and FIG. 5 on the top surface of the telescoping panel 13 also may be used to allow for a more side-to-side movement of various created partitions.

A means to lock the partition apparatus 10 also is contemplated by the present invention. The means to lock in the preferred embodiment is comprised of a set of roller wheels 23 that will move along the side rails 14. The position of the roller wheels 23 will be controlled by linkage as depicted in FIG. 4 and FIG. 5. This linkage 15 will be moved in the preferred embodiment by a center circular locking disc 17, which will move the plurality of linkage 15. The linkage 15 will control a pistons 100. The pistons 100 will compress piston springs 16 within cylinders 18 to lock into place. This will allow the partition apparatus as well as the telescoping panel 13 to be locked into position.

Figure 8:
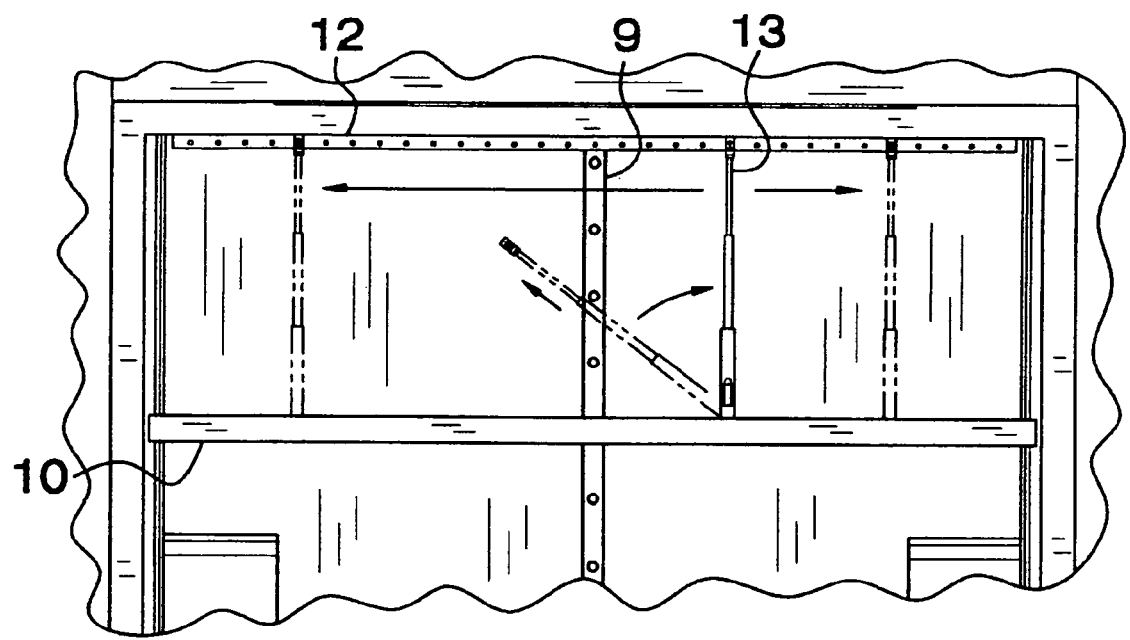
FIG. 8 is a top view of the present invention.
Figure 9:
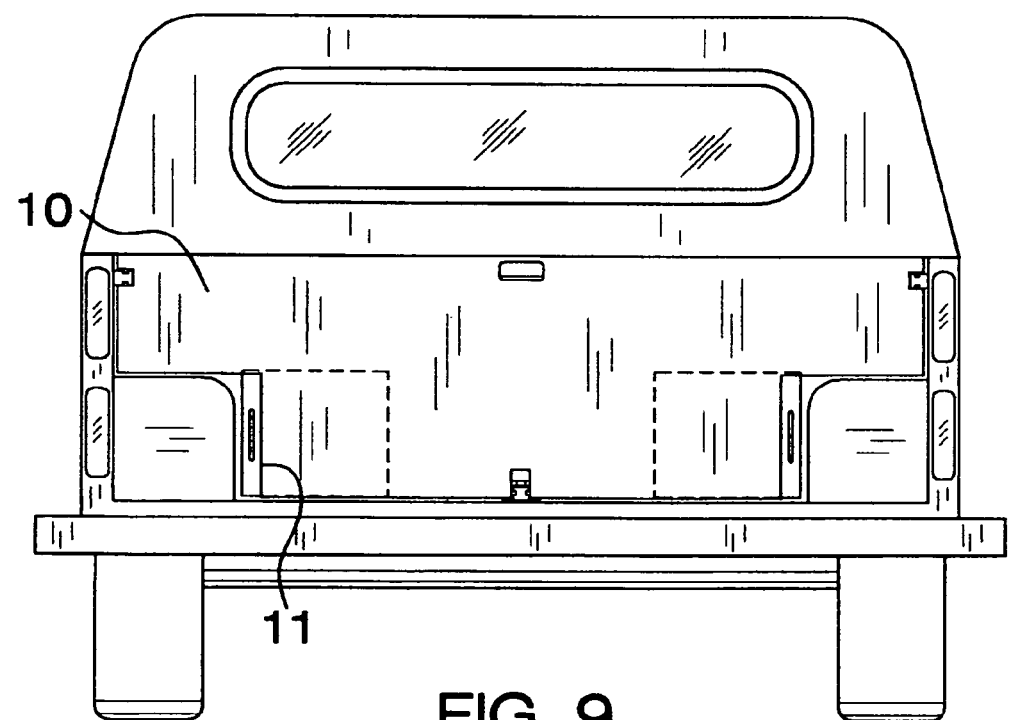
FIG. 9 is a back view of the present invention with the dashed lines indicating the recessed wheel well partitions.
Figure 10:
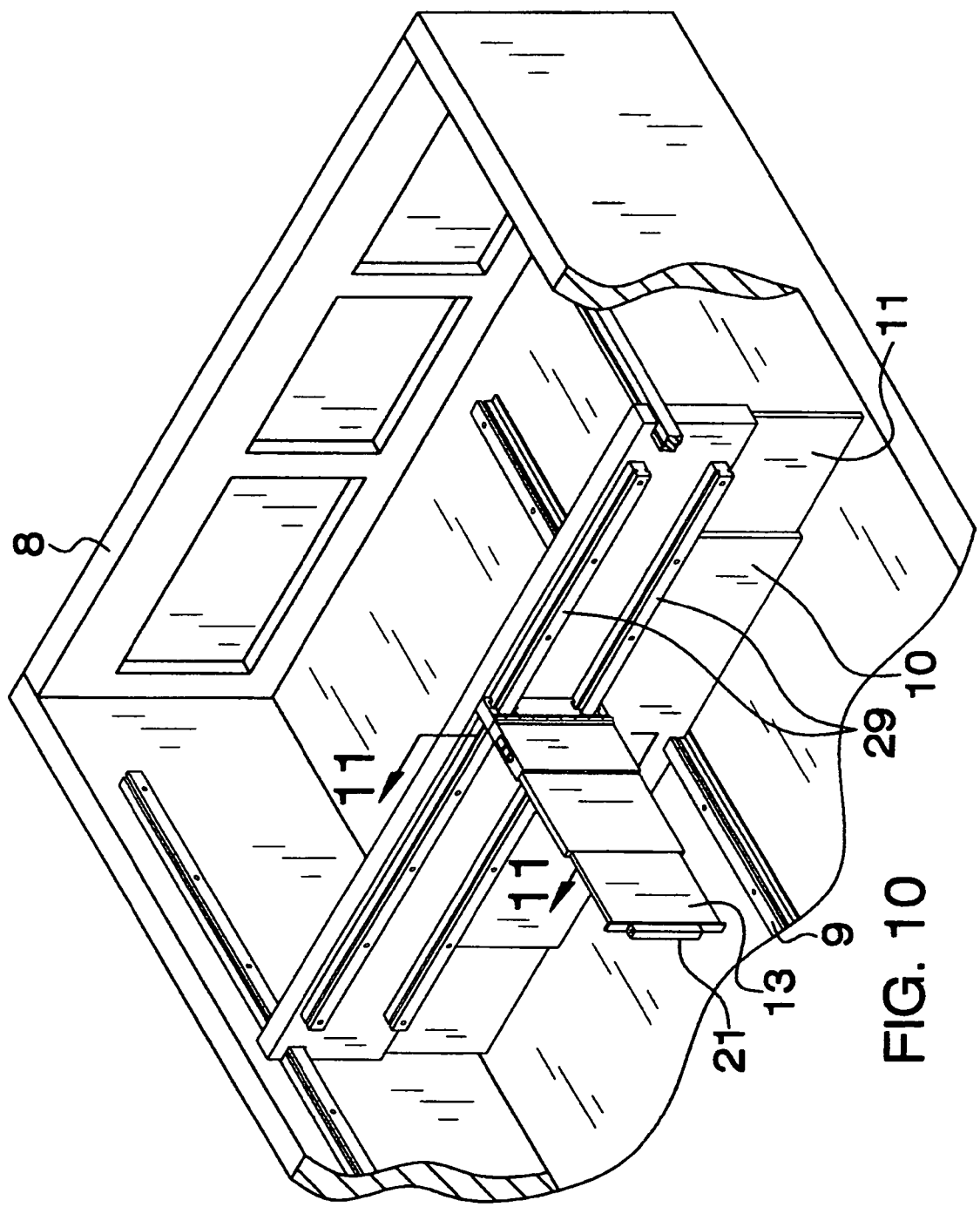
FIG. 10 is an additional environmental view of the present invention.
Figure 13:
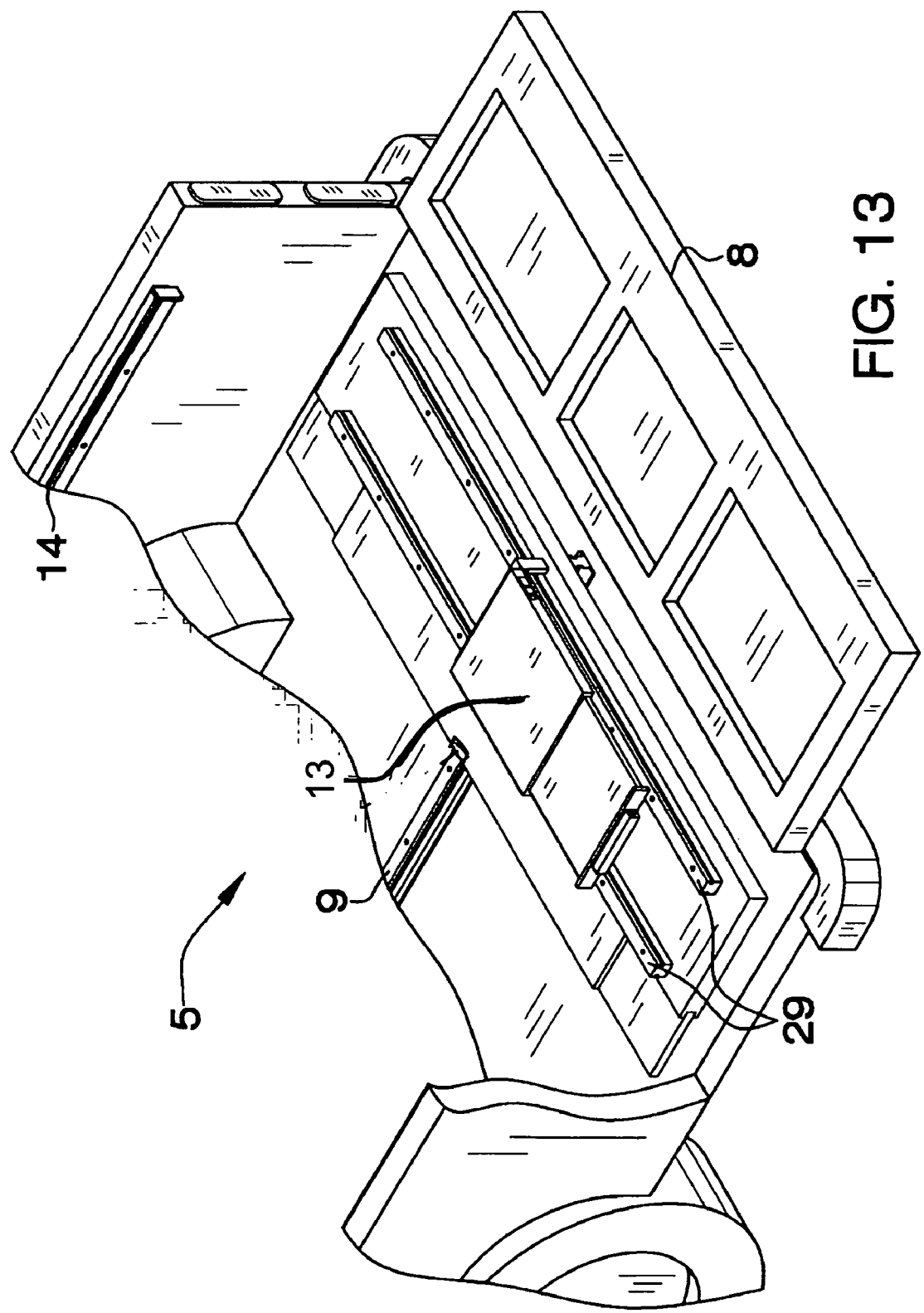
FIG. 13 is an additional environmental view of the present invention collapsed against the pickup truck bed.

FIG. 8 and FIG. 9 depict additional views of the preferred embodiment of the present invention. In FIG. 13, we see the partition apparatus 10 rolled toward the back of the bed 6 such that a telescoping panel 13 has been folded against, via conventional means, partition apparatus 10. In addition, partition apparatus 10 is no longer connected to side rails 14, as roller wheels 23 have been conventionally detached from side rails 14. Thus, bed 6 is able to be used in the case that the utility of the present invention is not desired, as FIG. 13 shows the present invention laid flat and disabled.

It should be understood the present invention is not merely the embodiment(s) described above, but can be any and all embodiments within the scope of the following claims.

I claim:

1. An adjustable mid-gate, comprising:
   a partition apparatus having a first wheel well partition and a second wheel well partition; and
   a telescoping panel, in slideable communication with said partition apparatus via roller wheels.

2. The adjustable mid-gate of claim 1, wherein said telescoping panel extends from one side of said partition apparatus.

3. The adjustable mid-gate of claim 1, wherein said first wheel well partition is positioned at a first bottom corner of said partition apparatus.

4. The adjustable mid-gate of claim 1, wherein said second wheel well partition is positioned at a bottom corner of said partition apparatus.

5. The adjustable mid-gate of claim 3, wherein said second wheel well partition is positioned at a second bottom corner of said partition apparatus.

6. The adjustable mid-gate of claim 1, further comprising side rails positioned to communicate with top corners of said partition apparatus.

7. The adjustable mid-gate of claim 6, further comprising a pickup bed rail positioned parallel to said side rails, said pickup bed rail positioned to communicate with a bottom center of said partition apparatus.

8. The adjustable mid-gate of claim 1, further comprising at least one front support rail positioned parallel to said partition apparatus, said at least one front support rail configured to receive said telescoping panel.

9. The adjustable mid-gate of claim 1, further comprising mid rails positioned parallel to said partition apparatus and on said partition apparatus, said mid rails configured to receive said telescoping panel.

10. The adjustable mid-gate of claim 1,
- wherein said telescoping panel extends from one side of said partition apparatus;
- wherein said first wheel well partition is positioned at a first bottom corner of said partition apparatus;
- wherein said second wheel well partition is positioned at a second bottom corner of said partition apparatus;
- further comprising side rails positioned to communicate with top corners of said partition apparatus;
- further comprising a pickup bed rail positioned parallel to said side rails, said pickup bed rail positioned to communicate with a bottom center of said partition apparatus;
- further comprising at least one front support rail positioned parallel to said partition apparatus, said at least one front support rail configured to receive said telescoping panel; and
- further comprising mid rails positioned parallel to said partition apparatus and on said partition apparatus, said mid rails configured to receive said telescoping panel.

* * * * *